(12) United States Patent  (10) Patent No.: US 7,999,878 B2
Ito  (45) Date of Patent: Aug. 16, 2011

(54) VEHICLE MOUNTED APPARATUS

(75) Inventor: Yoshinobu Ito, Toyoake (JP)

(73) Assignee: DENSO CORPORATION, Kariya (JP)

( * ) Notice: Subject to any disclaimer, the term of this patent is extended or adjusted under 35 U.S.C. 154(b) by 1464 days.

(21) Appl. No.: 11/451,353

(22) Filed: Jun. 13, 2006

(65) Prior Publication Data

US 2006/0288354 A1    Dec. 21, 2006

(30) Foreign Application Priority Data

Jun. 15, 2005  (JP) .................................. 2005-175010

(51) Int. Cl.
H04N 5/64   (2006.01)
(52) U.S. Cl. ....................................................... 348/837
(58) Field of Classification Search .................. None
See application file for complete search history.

(56) References Cited

U.S. PATENT DOCUMENTS

| | | | |
|---|---|---|---|
| 5,278,808 A * | 1/1994 | Takano | 369/11 |
| 6,070,722 A * | 6/2000 | Ng | 206/308.1 |
| 7,114,856 B2 * | 10/2006 | Ohbayashi et al. | 385/88 |

FOREIGN PATENT DOCUMENTS

| | | |
|---|---|---|
| JP | U-61-126460 | 8/1986 |
| JP | U-03-002495 | 1/1991 |
| JP | A-08-087873 | 4/1996 |
| JP | A-8-339673 | 12/1996 |
| JP | A-10-275453 | 10/1998 |
| JP | A-2004-103160 | 4/2004 |
| JP | A-2004-163077 | 6/2004 |

OTHER PUBLICATIONS

Office Action mailed Jul. 7, 2009 from the Japan Patent Office in corresponding Japanese patent application No. 2005-175010 (English translation enclosed).

* cited by examiner

*Primary Examiner* — Nhon T Diep
(74) *Attorney, Agent, or Firm* — Posz Law Group, PLC

(57) ABSTRACT

A vehicle-mounted apparatus includes a body having an insertion opening and a medium reader apparatus that reads data stored in a data storage medium inserted into the medium reader apparatus through the insertion opening, a front panel that is movable at least between a closed position where the panel hides the insertion opening and an opened position where the panel reveals the insertion opening so that the media can be inserted into the medium reader apparatus, and a sealing means that is provided with at least one of the panel and the body. When the panel is in the closed position, the panel and the body are connected together through the sealing member to seal the insertion opening. Thus, dust can be prevented from entering the body through the insertion opening.

6 Claims, 5 Drawing Sheets

VEHICLE MOUNTED APPARATUS

CROSS REFERENCE TO RELATED APPLICATION

This application is based on and incorporates herein by reference Japanese Patent Application No. 2005-175010 filed on Jun. 15, 2005.

FIELD OF THE INVENTION

The present invention relates to a vehicle-mounted apparatus having a movable panel.

BACKGROUND OF THE INVENTION

Recently, there has been an increase in the number of vehicles with a car-navigation apparatus. The car-navigation apparatus reads road map data stored in a data storage medium such as a DVD disc, or a CD disc and displays a road map on a display.

Typically, the car-navigation apparatus and an audio apparatus or an audio/video apparatus are integrated into one unit. This type of car-navigation apparatus has a flip-up or flip-down front panel with the display. An insertion opening is hidden behind the front panel and appears when the front panel is tilted forward. Thus, the DVD disc or the CD disk can be inserted into the car-navigation apparatus through the insertion opening.

A recording apparatus disclosed in JP-10-275453 has a disc door capable of swinging open and records on a storage media inserted through the disc door. The recording apparatus has a manual eject hole used to manually eject the inserted media from the apparatus. The eject hole is sealed with a spring plate having one fixed end.

Generally, the car-navigation apparatus is exposed continuously to vibrations and dust in the air while the vehicle is running. Therefore, there is a strong possibility that the dust may enter the car-navigation apparatus through the insertion opening. The dust in the car-navigation apparatus is deposited on a recording surface of the DVD disc by electrostatic forces. As a result, the DVD disc may be damaged.

The insertion opening of the car-navigation apparatus is provided with a protection film for preventing the entry of dust. The protection film is made of rubber and has a slit through which the DVD disc can be inserted into the car-navigation apparatus. However, the protection film cannot fully prevent the entry of dust.

In the recording apparatus disclosed in JP-10-275453, the disc door has a spring that presses the disc door against the insertion opening to prevent the entry of dust. However, the disc door cannot fully prevent the entry of dust through the insertion opening because force of the spring is not distributed equally over the disc door. Likewise, the spring plate for sealing the eject hole cannot fully prevent the entry of dust through the eject hole because force of the spring plate is not distributed equally around the eject hole.

SUMMARY OF THE INVENTION

In view of the above-described problem, it is an object of the present invention to provide a vehicle-mounted apparatus having a mechanism for preventing dust from entering the apparatus.

A vehicle-mounted apparatus includes a body having an insertion opening and a medium reader apparatus that reads data stored in a data storage medium inserted into the medium reader apparatus through the insertion opening, a front panel that is movable at least between a closed position where the panel hides the insertion opening and an opened position where the panel reveals the insertion opening so that the media can be inserted into the medium reader apparatus, and a sealing means that is provided with at least one of the panel and the body.

When the panel is in the closed position, the panel and the body are connected together through the sealing member to seal the insertion opening. This mechanism prevents dust from entering the body through the insertion opening.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENTS

First Embodiment

A car-navigation apparatus 1 according to the first embodiment of the present invention will now be described with reference to FIGS. 1 to 5. The navigation apparatus 1 and an audio/video apparatus are integrated into one unit so that the navigation apparatus 1 can read map data and audio/video data stored in a DVD disk as a data storage medium.

Figure 1:
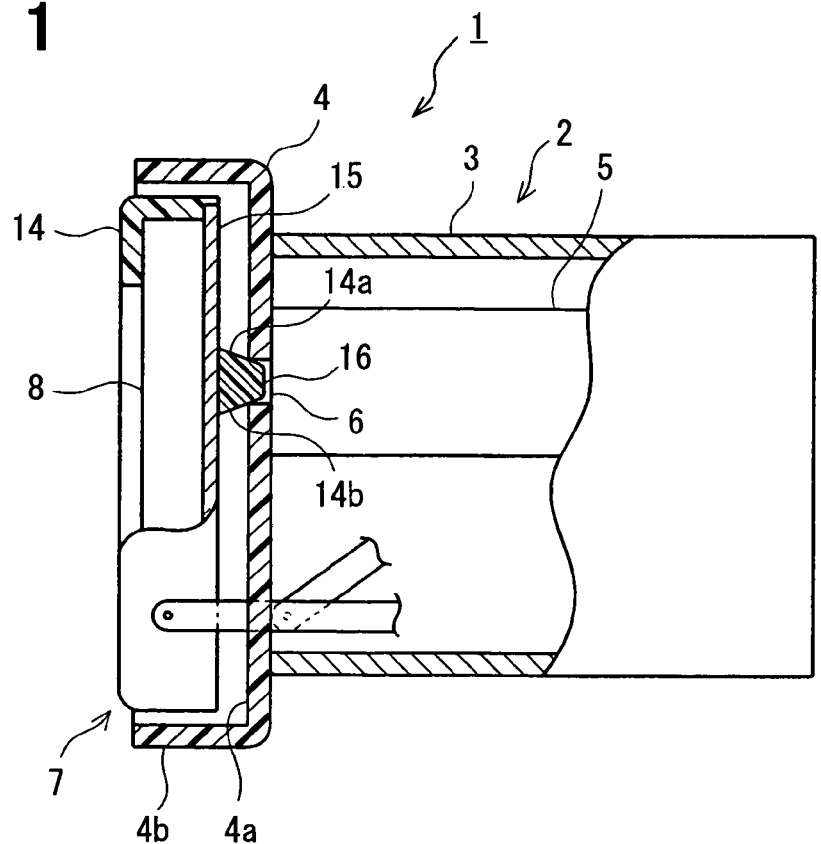
FIG. 1 is a vertical cross-sectional view showing a car-navigation apparatus according to a first embodiment of the present invention.

As shown in FIG. 1, the navigation apparatus 1 includes a body 2 and a front panel 7. The body 2 includes a housing 3 having a front (i.e., left side of FIG. 1) opening and an escutcheon 4 that is made of plastic and attached to the housing 3 to cover the front opening of the housing 3. A DVD reader drive 5 capable of reading the DVD disk is installed inside the housing 3. The escutcheon 4 has a bottom wall 4a that covers the front opening of the housing 3 and a side wall 4b that encloses the bottom wall 4a. The bottom wall 4a has a narrow insertion opening 6 through which the DVD disk is inserted into and removed from the DVD reader drive 5.

The front panel 7 has a display 8 as a display means. The front panel 7 has also push button switches 9 and a volume control knob 10 as a control means. After the DVD reader drive 5 reads the map data or the video data stored in the DVD disc, a road map or video is displayed on the display 8. The push button switches 9 controls operations of the DVD reader drive 5. The volume control knob 10 adjusts volume of sound that is output from the DVD reader drive 5 to a speaker (not shown).

A lower portion of the movable panel 7 is joined to a linkage member 11 extending from inside the housing 3. The linkage member 11 is driven by a motor (not shown) and varies in length.

Figure 4:
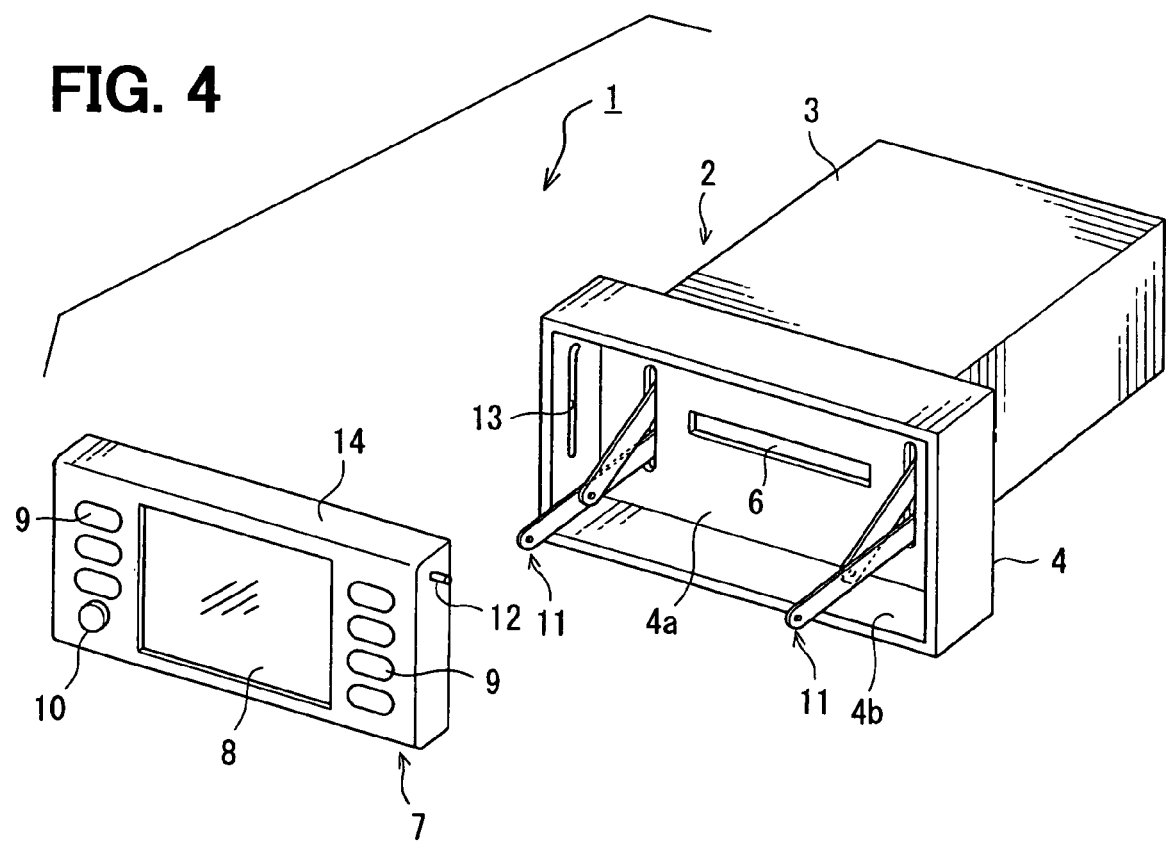
FIG. 4 is an exploded view of the navigation apparatus of FIG. 1.

As shown in FIG. 4, pin members 12 project outwardly from each side of an upper portion of the front panel 7. Grooves 13 are provided with each side of an inner surface of the escutcheon 4. Each of the grooves 13 extends in the vertical direction of FIG. 4. Each of the pin members 12 is fitted into the respective grooves 13 so that the front panel 7 can slide along the grooves 13.

Figure 5:
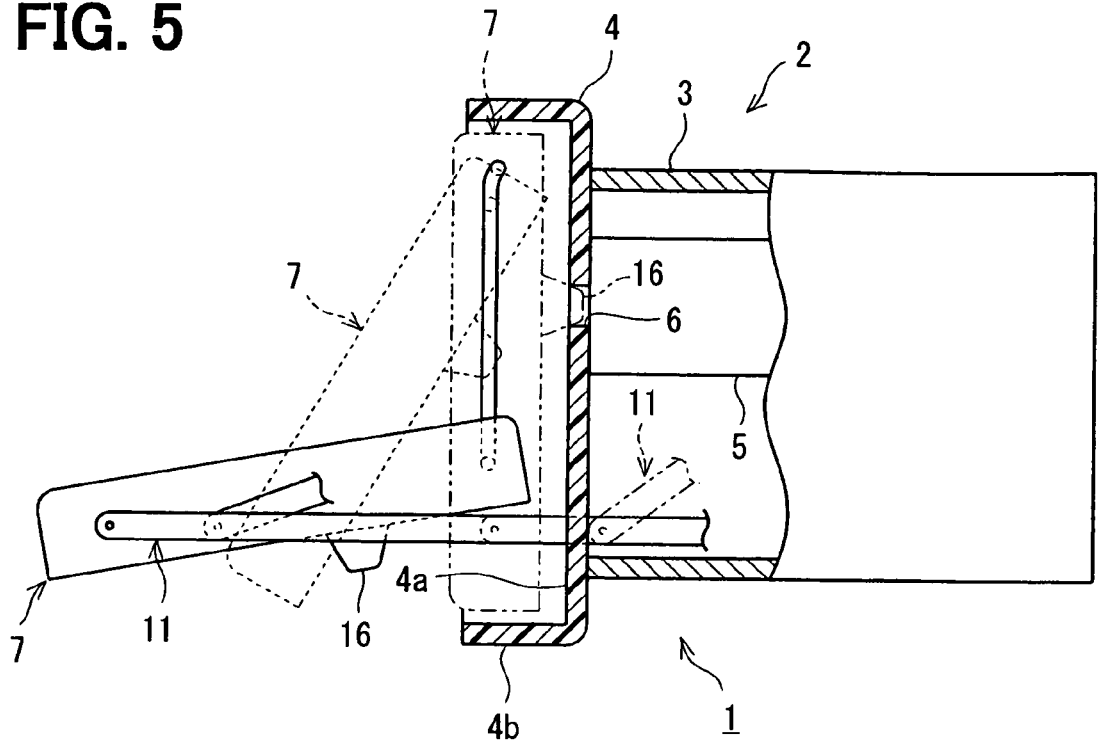
FIG. 5 is a vertical cross-sectional view showing movements of a front panel of the navigation apparatus of FIG. 1.

As shown in FIG. 5, the front panel 7 slides vertically along the grooves 13, while the front panel 7 moves back and forth by means of the linkage member 11. Thus, when the front panel 7 moves back and forth, an angle of inclination of the front panel 7 changes accordingly.

When the linkage member 11 extends to its maximum length, the front panel 7 is placed in an opened position indicated by a solid line of FIG. 5. In the opened position, the front panel 7 lies almost horizontally such that a front surface of the front panel 7 faces upwardly. Thus, when the front panel 7 is placed in the opened position, the insertion opening 6 appears so that the DVD disc can be inserted into and removed from the DVD reader drive 5 through the insertion opening 6.

In contrast, when the linkage member 11 returns to its original length, the front panel 7 is placed in a closed position indicated by a double dashed line of FIG. 5. In the closed position, the front panel 7 rises almost vertically and is housed inside the escutcheon 4 to fully cover the bottom wall 4a provided with the insertion opening 6.

As shown in FIG. 1, the front panel 7 is constructed with a plastic case 14 having a back (i.e. right side of FIG. 1) opening and a back plate 15. The back plate 15 is made of metal and covers the back opening of the plastic case 14. The back plate 15 has a horizontally long projection member 16 as a sealing means. The projection member 16 is made of an elastic material such a synthetic rubber and seals the insertion opening 6 of the escutcheon 4 when the front panel 7 is placed in the closed position.

Figure 2A:
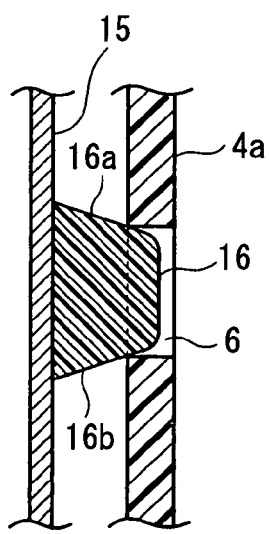
FIG. 2A is a vertical cross-sectional view showing an insertion opening of the navigation apparatus of FIG. 1.
Figure 2B:
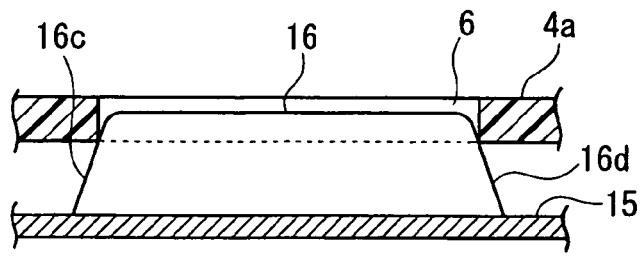
FIG. 2B is a horizontal cross-sectional view showing the insertion opening of the navigation apparatus of FIG. 1.
Figure 3:
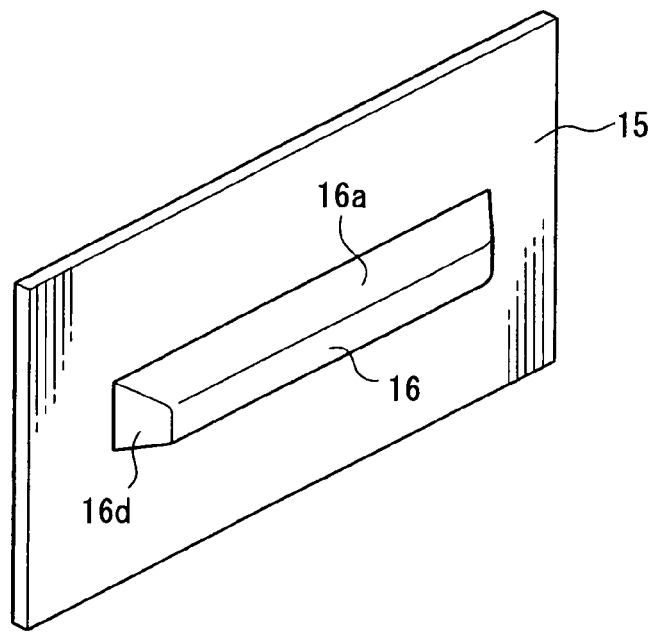
FIG. 3 is a perspective view showing a projection portion of the navigation apparatus of FIG. 1.

As shown in FIG. 2, the projection member 16 has inclined surfaces 16a-16d. When the front panel 7 is placed in the closed position, a portion of the projection member 16 is inserted into the insertion opening 6 and each of the surfaces 16a-16d is pressed against the edge of the insertion opening 6. Thus, the insertion opening 6 can be fully sealed with the projection member 16.

An open/close switch, which is one of the push bottom switches 9, operates the linkage member 11. A long push of the open/close switch allows the front panel 7 to move to the opened position or the close position. A short push of the open/close switch adjusts the angle of inclination of the front panel 7. For example, the short push of the open/close switch allows the front panel 7 to be held in a position that reduces reflection of light from the display 8, as indicated by a single-dashed line of FIG. 5. Thus, the display 8 can be clearly viewed by using the short push of the open/close switch.

The front panel 7 returns to the closed position, while the front panel 7 gradually rises. Then, when the front panel 7 is placed in the closed position, the potion of the projection member 16 is inserted into the insertion opening 6 and each of the inclined surfaces 16a-16d of the projection member 16 is pressed against the edge of the insertion opening 6. Because the linkage member 11 evenly pulls the front panel 7 backward (i.e., right side of FIG. 5), each of the inclined surfaces 16a-16d is evenly pressed against the edge of the insertion opening 6. Further, a top portion of the groove 13 is curved backward so that each of the inclined surfaces 16a-16d can be more evenly pressed against the edge of the insertion opening 6.

Thus, the insertion opening 6 can be fully sealed with the projection member 16 to prevent dust in the air from entering the DVD reader drive 5 through the insertion opening 6. Therefore, deposition of dust on a recording surface of the DVD disk and a read head of the DVD reader drive 5 can be prevented. Because of the inclined surfaces 16a-16d, the projection member 16 can be wedged (i.e., tightly fitted) into the insertion opening 6 to fully seal the insertion opening 6.

Second Embodiment

Figure 6A:
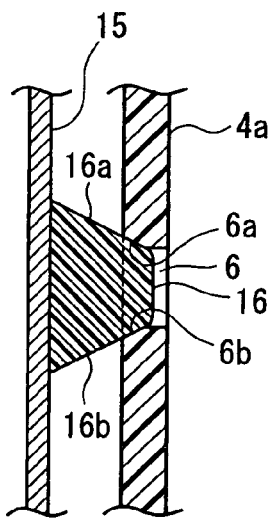
FIG. 6A is a vertical cross-sectional view showing an insertion opening according to a second embodiment of the present invention.
Figure 6B:
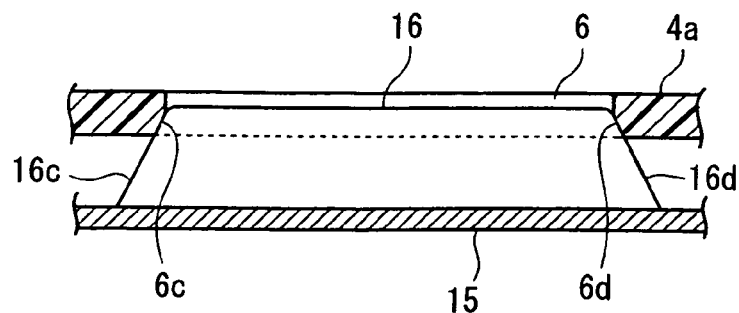
FIG. 6B is a horizontal cross-sectional view showing the insertion opening of FIG. 6A.

In the second embodiment, as shown in FIGS. 6A and 6B, the projection member 16 has the inclined surfaces 16a-16d and the insertion opening 6 also has inclined surfaces 6a-6d. When the front panel 7 is placed in the closed position, surface-to-surface contact between the inclined surfaces 16a-16d of the projection member 16 and the inclined surfaces 6a-6d of the insertion opening 6 is achieved. Thus, the insertion opening 6 can be fully sealed with the projection member 16.

Third Embodiment

Figure 7A:
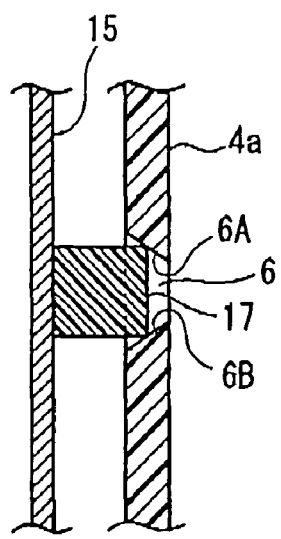
FIG. 7A is a vertical cross-sectional view showing an insertion opening according to a third embodiment of the present invention.
Figure 7B:
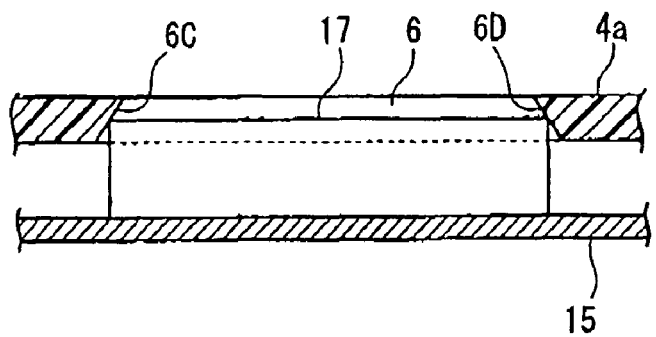
FIG. 7B is a horizontal cross-sectional view showing the insertion opening of FIG. 7A.

In the third embodiment, as shown in FIGS. 7A and 7B, the back plate 15 of the front panel 7 has a rectangular projection member 17 and the insertion opening 6 has inclined surfaces 6A-6D. When the front panel 7 is placed in the closed position, the edge of the projection member 17 is pressed against each of the inclined surfaces 6A-6D of the insertion opening 6. Thus, the insertion opening 6 can be fully sealed with the projection member 17.

Fourth Embodiment

Figure 8:
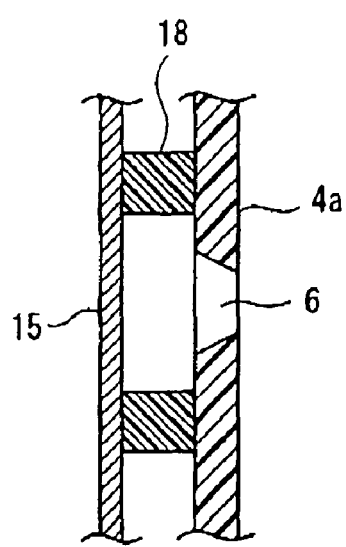
FIG. 8 is a vertical cross-sectional view showing an insertion opening according to a fourth embodiment of the present invention.
Figure 9:
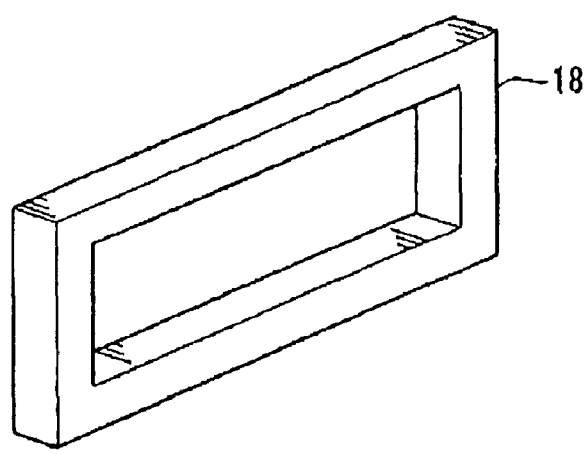
FIG. 9 is a perspective view showing a projection portion according to the fourth embodiment of the present invention.

In the fourth embodiment, as shown in FIGS. 8 and 9, a hollow rectangular member 18 is attached to the back plate 15 of the front panel 7. The hollow rectangular member 18 is made of an elastic material such as a synthetic rubber. When the front panel 7 is placed in the closed position, the insertion opening 6 is positioned inside the hollow portion of the hollow rectangular member 18. In this case, the linkage member 11 pulls the front panel 7 in such a manner that the hollow rectangular member 18 is pressed against the bottom wall 4a of the escutcheon 4. Thus, the insertion opening 6 can be fully sealed with the hollow rectangular member 18.

Fifth Embodiment

Figure 10:
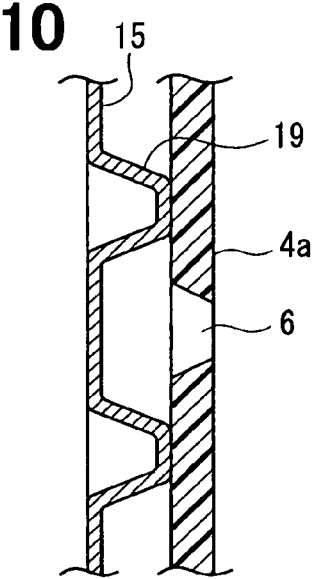
FIG. 10 is a vertical cross-sectional view showing an insertion opening according to a fifth embodiment of the present invention.

In the fifth embodiment, as shown in FIG. 10, the back plate 15 is formed in a shape such that the back plate 15 has a projection portion 19 serving as the hollow rectangular member 18 of the fourth embodiment. For example, a conventional deep drawing may form the back plate 15.

Sixth Embodiment

Figure 11:
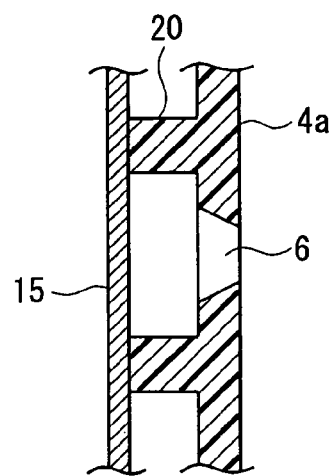
FIG. 11 is a vertical cross-sectional view showing an insertion opening according to a sixth embodiment of the present invention.

In the sixth embodiment, as shown in FIG. 11, the bottom wall 4a of the escutcheon 4 is formed such that the bottom wall 4a has a projection portion 20 that encloses the insertion opening 6. When the front panel 7 is placed in the closed position, the back plate 15 of the front panel 7 is pressed against the projection portion 20 of the bottom wall 4a. Thus, the insertion opening 6 can be fully sealed with the projection portion 20.

Seventh Embodiment

Figure 12:
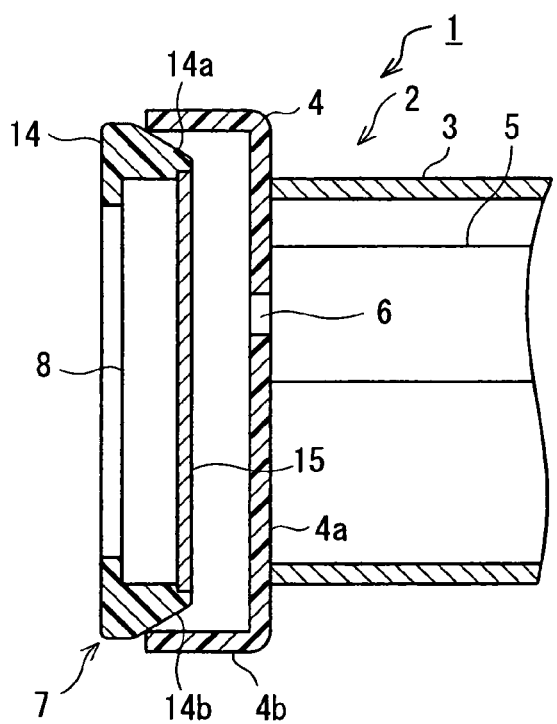
FIG. 12 is a vertical cross-sectional view showing an insertion opening according to a seventh embodiment of the present invention.

In the seventh embodiment, as shown in FIG. 12, the plastic case 14 of the front panel 7 has inclined surfaces 14a, 14b and the outer circumference of the plastic case 14 is slightly larger than the inner circumference of the escutcheon 4. Therefore, when the front panel 7 is placed in the closed position, each of the inclined surfaces 14a, 14b of the plastic panel 14 is pressed against the edge of the side wall 4b of the escutcheon 4. Thus, an inside of the escutcheon 4 is fully sealed so that the insertion opening 6 can be fully sealed.

Eighth Embodiment

Figure 13:
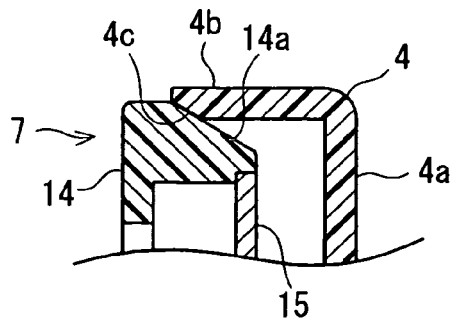
FIG. 13 is a vertical cross-sectional view showing an insertion opening according to an eighth embodiment of the present invention.

In the eighth embodiment, as shown in FIG. 13, the plastic case 14 of the front panel 7 has the inclined surface 14a and the outer circumference of the plastic case 14 is slightly larger than the inner circumference of the escutcheon 4. Further, the side wall 4b has an inclined surface 4c so that surface-to-surface contact between the plastic case 14 of the front panel 7 and the side wall 4b of the escutcheon 4 is achieved. Thus, the insertion opening 6 can be fully sealed.

Ninth Embodiment

Figure 14:
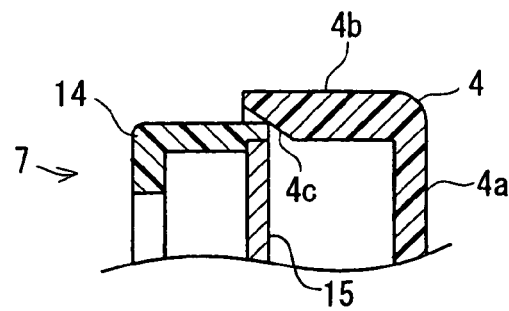
FIG. 14 is a vertical cross-sectional view showing an insertion opening according to a ninth embodiment of the present invention.

In the ninth embodiment, as shown in FIG. 14, whereas the side wall 4b has the inclined surface 4c, the plastic case 14 of the movable front panel 14 has no inclined surface. When the front panel 7 is placed in the closed position, the edge of the plastic panel 14 are pressed against the inclined surface 4c of the side wall 4b of the escutcheon 4. Thus, the inside of the escutcheon 4 is fully sealed so that the insertion opening 6 can be fully sealed.

(Modifications)

The embodiments described above may be modified in various ways. For example, various types of opening and closing mechanisms instead of the linkage member 11 may allow the front panel 7 to move between the closed position and the opened position.

The front panel 7 may perform various types of movements to hide or reveal the insertion opening 6. For example, the front panel 7 may move vertically or swing to hide or reveal the insertion opening 6.

The projection members 16-18 may be made of a material other than the elastic material.

The present invention can be applied to a vehicle-mounted apparatus other than the car-navigation apparatus 1.

A cassette tape instead of the DVD disc may be used as the data storage medium. In this case, a tape deck instead of the DVD reader drive 5 is used.

The front panel 7 may have either the display 8 or the push button switch 9 and the volume control knob 10.

Such changes and modifications are to be understood as being within the scope of the present invention as defined by the appended claims.

What is claimed is:

1. A vehicle-mounted apparatus comprising:
   a body that includes an insertion opening;
   a medium reader apparatus that reads data stored in a data storage medium inserted into the medium reader apparatus through the insertion opening;
   a panel that is movable at least between a closed position where the panel hides the insertion opening and an opened position where the panel reveals the insertion opening; and
   a sealing member that is provided with the panel and that is configured with a projection portion projecting toward the body to be inserted into the insertion opening when the panel is in the closed position, wherein
   at least one of an outer surface of the projection portion and an inner surface of the insertion opening has an inclined surface through which the panel and the body are connected together through the sealing member to seal the insertion opening when the panel is in the closed position.

2. The apparatus according to claim 1, wherein the sealing member is integrally provided with at least one of the panel and the body.

3. The apparatus according to claim 1, wherein the panel has at least one of a control means for controlling the medium reader apparatus and a display means for displaying information related to the data read by the medium reader apparatus.

4. The apparatus according to claim 1, wherein the projection portion is made of an elastic material.

5. The apparatus according to claim 1, wherein the media reader apparatus remains operable when the panel is in the closed position.

6. The apparatus according to claim 1, wherein the outer surface of the projection portion and the inner surface of the insertion opening are in contact with each other in such a manner that a tip of the projection portion is located inside the insertion opening.

* * * * *